(12) United States Patent
Yim

(10) Patent No.: US 6,378,634 B1
(45) Date of Patent: Apr. 30, 2002

(54) TRACKING DEVICE

(75) Inventor: Mark H. Yim, Palo Alto, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/722,630

(22) Filed: Nov. 28, 2000

(51) Int. Cl.[7] .............................................. B62D 57/00
(52) U.S. Cl. ...................... 180/7.1; 180/65.1; 280/205; 446/409; 446/437; 446/233; 446/441
(58) Field of Search ................................ 180/7.1, 65.1, 180/65.8; 280/205, 206; 446/409, 437, 233, 431, 441, 454, 457

(56) References Cited

U.S. PATENT DOCUMENTS

| | | | |
|---|---|---|---|
| 942,952 A | * 12/1909 | Wrather ......................... 74/5.7 |
| 3,968,593 A | 7/1976 | Lin |
| 4,438,588 A | 3/1984 | Martin |
| 4,501,569 A | * 2/1985 | Clark, Jr. et al. ............. 180/21 |
| 4,726,800 A | * 2/1988 | Kobayashi ................... 446/458 |
| 4,927,401 A | * 5/1990 | Sonesson ..................... 280/206 |
| 5,041,051 A | * 8/1991 | Sonesson ..................... 446/456 |
| 5,150,625 A | * 9/1992 | Mishler ........................ 74/5 R |
| 5,409,414 A | 4/1995 | Sheang |
| 5,439,408 A | 8/1995 | Wilkinson |
| 5,533,920 A | 7/1996 | Arad et al. |
| 5,800,300 A | * 9/1998 | Childress .................... 474/190 |
| 5,934,968 A | * 8/1999 | Lin ............................. 446/358 |

OTHER PUBLICATIONS

Hugh C. Crenshaw, "Orientation by Helical Motion—I. Kinematics of the Helical Motion of Organisms with up to Six Degrees of Freedom," (1993), *Bulletin of Mathematical Biology*, vol. 55, No. 1, pp. 197–212.

* cited by examiner

*Primary Examiner*—Daniel G. DePumpo
(74) *Attorney, Agent, or Firm*—Oliff & Berridge, PLC

(57) ABSTRACT

A tracking device includes an external member and an internal member rotatable relative to the external member. A motor is attached to the internal member and includes a rotor shaft attached to the external member. A pair of target sensors that sense a phenomenon such as a magnetic field, sound, light or RF radiation, provide input to a controller that controls rotation of the motor. Angular acceleration of the internal member will cause an equal and opposite angular acceleration of the external member and the tracking device will roll toward the target. The tracking device may hop by suddenly stopping the rotation of the internal member or by suddenly decreasing or increasing the acceleration of the motor or by inserting a linkage fixed to the external member into the rotation path of the internal member.

17 Claims, 3 Drawing Sheets

TRACKING DEVICE

BACKGROUND OF THE INVENTION

1. Field of Invention

This application relates to a tracking device, having one controllable degree of freedom, that is movable with six degrees of freedom.

2. Description of Related Art

Tracking devices may be used in areas such as planetary exploration, mobile remote sensing, tracking of moving land-based agents such as people, animals, and automobiles, automatically deployable parameter sensors, and smart bombs. However, in order for the tracking device to move with six degrees of freedom, complicated propulsion and control systems are necessary. This results in tracking devices of increased cost and size.

Eukaryotic single-celled micro-organisms function as tracking devices but are capable of controlling only one degree of freedom. The micro-organisms are capable of movement with six degrees of freedom, however, toward and away from a sensed stimuli, such as food sources and light. The micro-organisms control their one degree of freedom to essentially move forward in a helical pattern. The micro-organisms track a stimuli by modulating the speed of their one degree of freedom motion through a simple feedback system. As the micro-organism spins around, it senses the stimuli sinusoidally. By modulating its spinning speed in a manner directly proportional to the sensed stimuli, the micro-organism moves toward, or away from, depending on the sense of modulation, the stimuli by precession, i.e., the motion of an axis of the microorganism due to an applied external force. The motion of single-celled microorganisms is described more thoroughly in "Orientation by Helical Motion—I. Kinematics of the Helical Motion of Organisms with up to Six Degrees of Freedom," by Hugh C. Crenshaw, published in the Bulletin of Mathematical Biology, Vol. 55, No. 1, pp. 197–212 (1993).

Self-propelled balls used as toys and amusement devices are known, for example, from U.S. Pat. Nos. 5,533,920, 5,439,408, and 4,438,588. U.S. Pat. No. 5,533,920 to Arad et al. discloses a self-propelled musical toy ball having a centrally or eccentrically mounted self-propelling device and an integrated circuit sound effects chip. The ball includes a bump switch that causes the self-propelling device to turn off if the ball runs into an obstacle. U.S. Pat. No. 5,439,408 to Wilkinson discloses a remote control movable ball amusement device that has a propulsion mechanism including a receiver and a drive unit. The drive unit includes eccentrically mounted weights rotated by a motor that is activated by a signal from a remote control unit. U.S. Pat. No. 4,438,588 to Martin discloses a remote control ball including a remote control toy vehicle inserted into the ball and a switch that turns off power when the vehicle is inverted.

The balls discussed above include complicated transmissions and are not capable of tracking a target. The balls also require initiation and supervision by an operator and are operable only with a limited type of power supply, such as conventional batteries.

SUMMARY OF THE INVENTION

This invention provides a tracking device that is movable with six degrees of freedom by controlling movement with one degree of freedom.

In various exemplary embodiments of the tracking device according to this invention, the tracking device includes an external member and an internal member that is rotatable relative to the external member. A motor is attached to the internal member and includes a rotor shaft that is attached to the external member. At least one power source is provided for the motor. A pair of ground contact sensors and a pair of target sensors provide input to a controller so as to increase or decrease the rotation of the internal member with respect to the external member.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the. following figures, wherein.

DETAILED DESCRIPTION OF PREFERRED EMBODIMENTS

Figure 1:
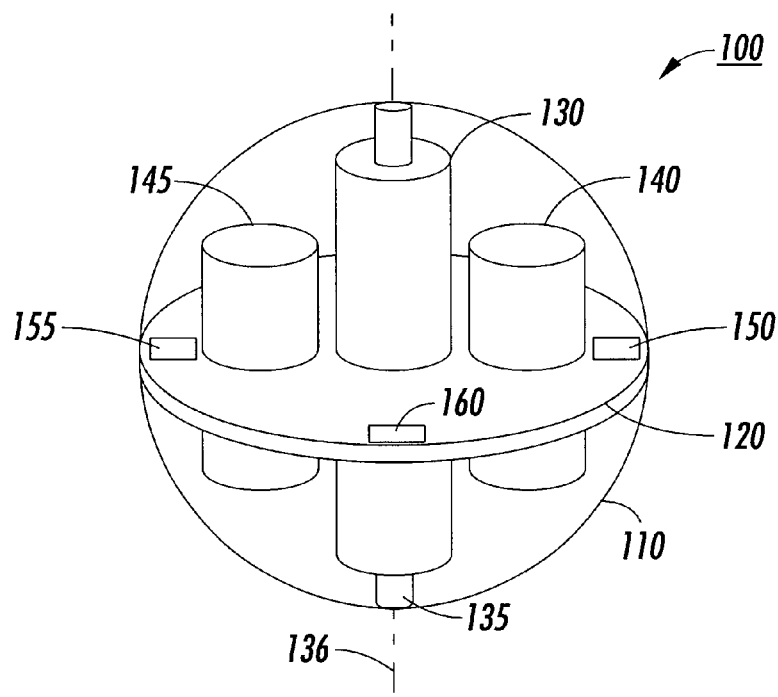
FIG. 1 is a perspective view schematically illustrating one exemplary embodiment of a tracking device according to the invention.

FIG. 1 is a perspective view of a first exemplary embodiment of a tracking device 100 according to the invention. An external member 110 is rotatable relative to an internal member 120. As shown in FIG. 1, the external member 110 may be spherical and the internal member 120 may be disk-shaped. A motor 130 is attached to the internal member 120. A rotor shaft 135 of the motor 130 is attached to the external member 110. The rotor shaft 135 defines a spinning axis 136 of the tracking device 100. Rotation of the rotor shaft 135 causes the internal member 120 to rotate relative to the external member 110 in a gyroscopic fashion. In various exemplary embodiments of the tracking device 100 according to the invention, the internal member 120 constantly rotates relative to the external member 110. However, it should be appreciated that the motor 130 may be selectively actuable to rotate the rotor shaft 135 under specified conditions.

One or more power supplies 140 and 145 are attached to the internal member 120 and provide power to the motor 130. Although two power supplies 140 and 145 are shown, it should be appreciated that more than two power supplies may be provided or only one power supply may be provided. In various exemplary embodiments of the tracking device 100 according to the invention, the power supplies 140 and 145 are batteries. In various other exemplary embodiments of the invention, the power supplies 140 and 145 may be solar cells. It should be, appreciated that any source capable of supplying electric power to the motor 130 may be used as the one or more power supplies.

Two target sensors 150 and 155 are provided on the internal member 120. The target sensors 150 and 155 may sense any phenomenon that provides a magnitude, such as a magnetic field, sound, light and RF radiation. Additionally, the target sensors 150 and 155 may be responsive to signals from the global positioning satellite (GPS) system.

According to various exemplary embodiments of the tracking device according to the invention, the target sensors may be solar cells. The use of solar cells allows the tracking device 100 to track the sun as a planet rotates, allowing the tracking device to be used in planetary exploration. The solar cells may also function as the power supply to the motor 130 in addition to sensing the sun.

Figure 2:
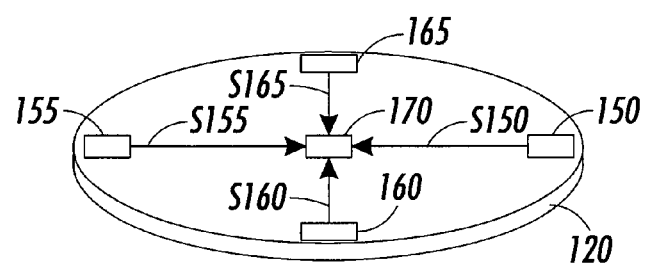
FIG. 2 is a perspective view schematically illustrating the internal member, the ground contact sensors, the target sensors and the controller of the tracking device according to the invention.

Two ground contact sensors 160 and 165 are also provided diametrically opposed to each other on the internal member 120. The ground contact sensors 160 and 165 may be proximity sensors. As shown in FIG. 2, the target sensors 150 and 155 are provided diametrically opposed to each other in a direction perpendicular to the direction in which the ground contact sensors 160 and 165 are diametrically opposed to each other. It should be appreciated, however, that other sensor positioning arrangements may be used, as long as the target sensors 150 and 155 are diametrically opposed to one another and the ground contact sensors 160 and 165 are diametrically opposed to one another.

Figure 3:
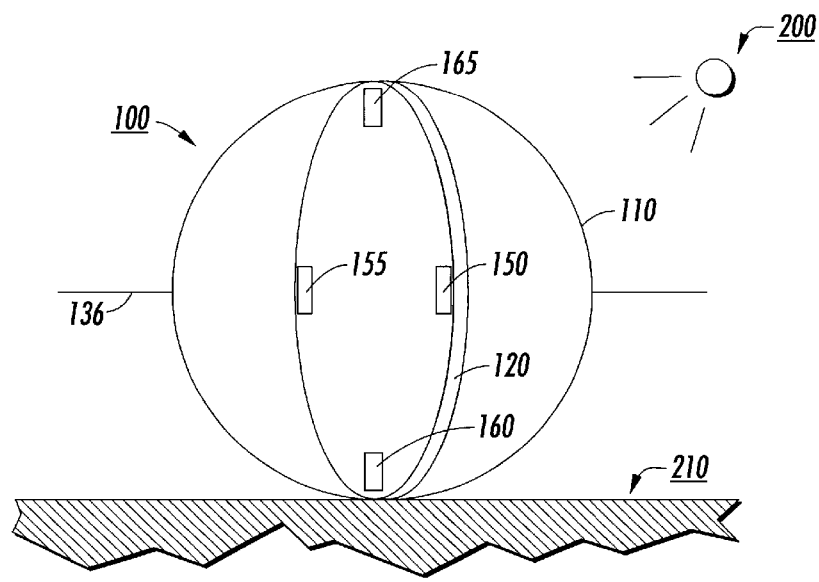
FIG. 3 is a perspective view schematically illustrating control of the tracking device according to the invention.

As shown in FIG. 2, each sensor. 150, 155, 160 and 165 outputs a signal S150, S155, S160 and S165, respectively, to a controller 170 that controls the rotational speed of the motor 130. The signals S150, S155, S160, and S165 are proportional to the distance of the sensors 150, 155, 160, and 165, respectively, from a target 200, as shown in FIG. 3. The controller 170 then determines the product P of the differential of the respective sensor pairs 150, 155 and 160, 165 as:

$$P=(S150-S155)\times(S160-S165).$$

If the product P is a positive value, the controller 170 controls the motor 130 to accelerate the rotation of the internal member 120 so that the tracking device 100 moves toward the target 200. Conversely, if the target 200 were on the other side of the tracking device 100, the product P is a negative value, and the controller controls the motor 130 to decelerate the rotation of the internal member 120. Although the controller 170 has been described as causing the tracking device 100 to move toward the target 200, it should be appreciated that the controller 170 may control the motor 130 to cause the tracking device 100 to move away from the target 200.

Referring to FIG. 3, when the tracking device 100 is proximate to the target 200, the signal S150 provided by the target sensor 150 is larger than the signal S155 provided by the target sensor 155 because the target sensor 150 is closer to the target 200. Additionally, the ground contact sensor 160 will provide a signal S160 that is larger than the signal S165 provided by the ground contact sensor 165 as the ground contact 160 is closer to the ground 210 than thee ground contact sensor 165. As the differential (S150–S155) is positive and the differential (S160–S165) is positive, the product P of the differentials is positive. The controller 170 will therefore increase the rotation of the motor 130 which will increase the internal rotation of the internal member 120. The angular acceleration of the internal member 120 will cause an equal and opposite angular acceleration of the external member 110 and the tracking device 100 will start to roll towards the target 200.

The spinning axis 136 defined-by the rotor shaft 135 of the tracking device 100 will tend to precess naturally due to gravity and the attitude of the spinning axis 136 will tend to rotate. As precession occurs, the tracking device 100 will roll toward the. target 200. As shown in FIG. 3, the tracking device 100 will roll when the spinning axis 136 is tilted relative to the ground 210. There are saddle points, however, where the external member I 10 of the tracking device 100 will not roll. When the spinning axis 136 is perpendicular to the ground 210, or perpendicular to the target 200, or parallel to gravity, no rolling of the external member 110 will occur. However, because the saddle points are unstable, normal "noise" in the components of the tracking device will cause the spinning axis 136 to move off of the saddle points and cause rotation of the external member 110. Any other position of the spinning axis 136 will cause the external member 110 of the tracking device 100 to accelerate along a vector having a component toward the target 200.

Figure 4:
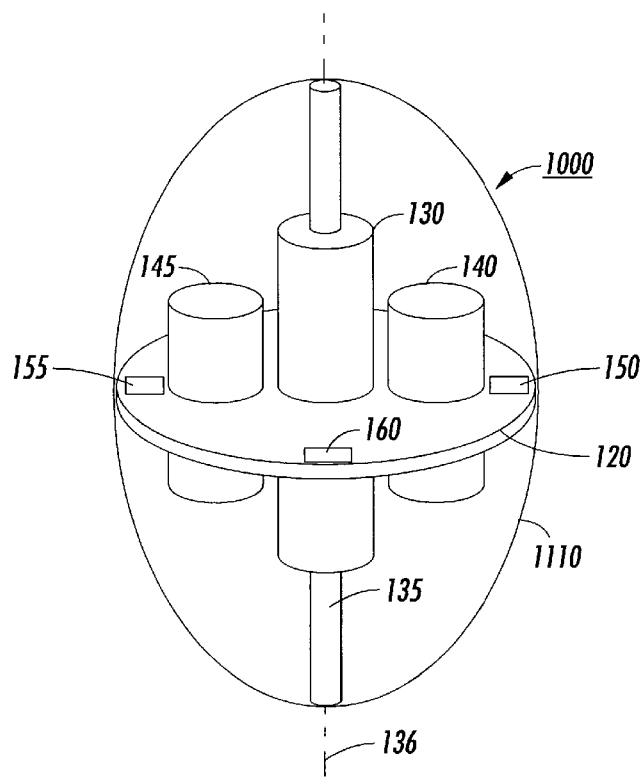
FIG. 4 is a perspective view schematically illustrating a second exemplary embodiment of the tracking device according to the invention.

Although the external member 110 is shown in FIGS. 1 and 3 as spherical, it should be appreciated that the external member 110 need not be spherical. As shown in FIG. 4, a second exemplary tracking device 1000 according to the invention may include an external member 1110 that is ovoid. The use of an ovoid external member 1110 allows the tracking device to avoid the saddle points more easily.

Figure 5:
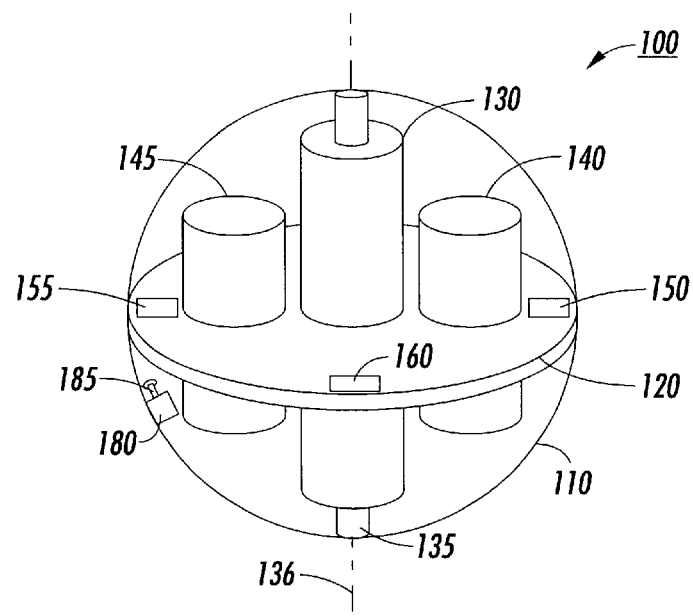
FIG. 5 is a perspective view schematically illustrating a third exemplary embodiment of the tracking device according to the invention.

FIG. 5 shows a third exemplary embodiment of the tracking device 100 according to the invention. As shown in FIG. 5, the tracking device 100 can hop by suddenly stopping the rotation of the internal member 120 or by suddenly decreasing or increasing the acceleration of the motor 130. The rotation of the internal member 120 may be suddenly stopped by inserting a linkage fixed to the external member 110 into the rotation path of the internal member 120. For example, a solenoid plunger 185 of a solenoid 180 attached to the external member 110 may be controlled by the controller 170 to contact the internal member 120 to suddenly stop the rotation of the internal member 120. If the tracking device 100 gets stopped by an obstacle, the tracking device 100 can hop out of the path of the obstacle.

Figure 6:
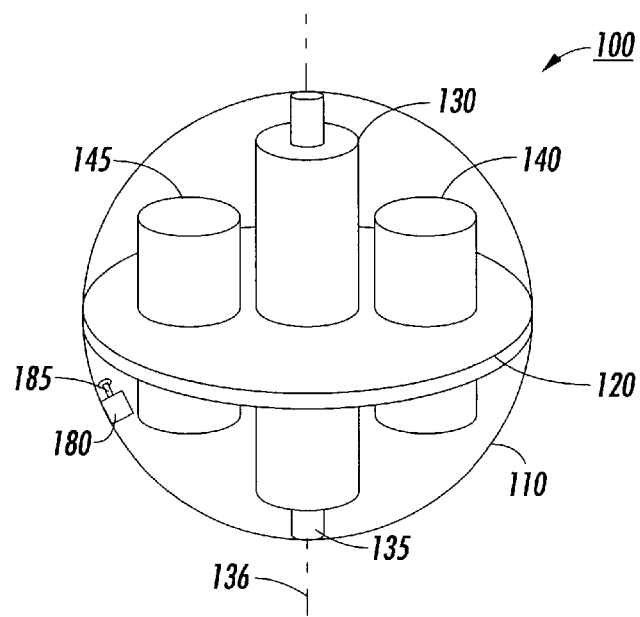
FIG. 6 is a perspective view schematically illustrating an exemplary rolling device according to the invention.

FIG. 6 shows an exemplary embodiment of a rolling device 101 according to the invention. As shown in FIG. 6, the rolling device 101 is similar to the tracking device 100 shown in FIGS. 1 and 5 with the exception of the target sensors 150 and 155 and the ground contact sensors 160 and 165 are not provided. The rolling device 101 can hop by suddenly stopping the rotation of the internal member 120 or by suddenly decreasing or increasing the acceleration of the motor 130. The rotation of the internal member 120 may be suddenly stopped by inserting the solenoid plunger 185 of the solenoid 180 attached to the external member 110 into the rotation path of the internal member 120 to suddenly stop the rotation of the internal member 120. The controller 170 may be programmed to insert the solenoid plunger 185 into the internal member's rotation path under specified conditions or randomly.

Although the rolling device 101 has been described as hopping by insertion of the solenoid plunger 185 into contact with the internal member 120, it should be appreciated that the device 101 may be configured as a hopping device that moves only by hopping without any rolling.

The various exemplary tracking devices according to the invention disclosed herein may be used in mobile remote sensors, planetary exploration, tracking of moving land-based agents, such as people, animals and/or vehicles, automatically deployable parameter sensors, robot pixels for displays or smart toner, laser guided smart-bombs or flash-bangs, toys, robo-pets, automatic dustball collectors and/or small luggage carriers. As the various exemplary tracking devices according to the invention disclosed herein include only one motor, no transmission and a single controller, the cost and complexity of the tracking devices 100 and 1000 are reduced.

It should be understood that the controller 170 shown in FIG. 2 can be implemented as a physically distinct hardware circuit or an ASIC, or using an FPGA, a PDL, a PLA or a PAL, or using discrete logic elements or discrete circuit elements. The particular form the controller 170 shown in FIG. 2 will take is a design choice and will be obvious and predictable to those skilled in the art. For example, the controller 170 may include three signal-conditioning operational amplifiers, a field effect transistor (FET), a power transistor and resistors.

While the invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A tracking device, comprising:
   an external member;
   an internal member rotatable relative to the external member;
   a motor attached to the internal member and having a rotor shaft attached to the external member;
   at least one power source for the motor;
   a pair of target sensors on the internal member that detect a target;
   a pair of ground contact sensors on the internal member; and
   a controller that controls the rotation of the rotor shaft based on signals provided by the target sensors and ground contact sensors.

2. The tracking device according to claim 1, wherein the ground contact sensors are proximity sensors.

3. The tracking device according to claim 1, wherein the ground contact sensors are provided opposite to each other on the internal member.

4. The tracking device according to claim 1, wherein the target is at least one of a magnetic field, sound, light, and RF radiation.

5. The tracking device according to claim 1, wherein the controller controls the motor to move the tracking device toward the target.

6. The tracking device according to claim 1, wherein the controller controls the motor to move the tracking device away from the target.

7. The tracking device according to claim 1, wherein the external member is spherical.

8. The tracking device according to claim 1, wherein the external member is ovoid.

9. The tracking device according to claim 1, wherein the internal member is a disc.

10. The tracking device according to claim 1, wherein the at least one power source is a battery.

11. The tracking device according to claim 1, wherein the at least one power source is a solar cell.

12. The tracking device according to claim 1, further comprising a member attached to the external member selectively actuable by the controller to contact the internal member to stop rotation of the internal member and cause hopping of the tracking device.

13. The tracking device according to claim 12, wherein the member is a solenoid plunger.

14. A rolling device, comprising:
    an external member;
    an internal member rotatable relative to the external member;
    a motor attached to the internal member and having a rotor shaft attached to the external member;
    at least one power source for the motor;
    a controller that controls the rotation of the rotor shaft; and
    a member attached to the external member selectively actuable by the controller to contact the internal member to stop rotation of the internal member and cause hopping of the rolling device.

15. The rolling device according to claim 14, wherein the member is a solenoid plunger.

16. A hopping device, comprising:
    an external member;
    an internal member rotatable relative to the external member;
    a motor attached to the internal member and having a rotor shaft attached to the external member;
    at least one power source for the motor;
    a controller that controls the rotation of the rotor shaft; and
    a member attached to the external member selectively actuable by the controller to contact the internal member to stop rotation of the internal member and cause hopping of the hopping device.

17. The hopping device according to claim 16, wherein the member is a solenoid plunger.

* * * * *